United States Patent
Farrell

(10) Patent No.: US 10,766,459 B1
(45) Date of Patent: Sep. 8, 2020

(54) DE-ICING WINDSHIELD WIPERS

(71) Applicant: Wyndell Don Farrell, Washington, OK (US)

(72) Inventor: Wyndell Don Farrell, Washington, OK (US)

(*) Notice: Subject to any disclaimer, the term of this patent is extended or adjusted under 35 U.S.C. 154(b) by 0 days.

(21) Appl. No.: 16/561,298

(22) Filed: Sep. 5, 2019

(51) Int. Cl.
*B60S 1/04* (2006.01)
*B60S 1/02* (2006.01)
*B60S 1/54* (2006.01)

(52) U.S. Cl.
CPC ............ *B60S 1/0483* (2013.01); *B60S 1/023* (2013.01); *B60S 1/0477* (2013.01); *B60S 1/54* (2013.01)

(58) Field of Classification Search
CPC .. B60S 1/546; B60S 1/548; B60S 1/54; B60S 1/0483; B60S 1/0477; B60S 1/023; B60S 1/048; B60S 1/0486; B60H 1/242; B60J 1/2011
See application file for complete search history.

(56) References Cited

U.S. PATENT DOCUMENTS

| | | | |
|---|---|---|---|
| 1,806,059 A * | 5/1931 | Hoople | B60J 3/02 248/276.1 |
| 1,940,062 A | 12/1933 | Schanley | |
| 2,000,743 A | 5/1935 | Cohen | |
| 2,124,925 A | 7/1938 | McNeal | |
| 2,154,731 A | 4/1939 | Crowley | |
| 2,659,942 A | 11/1953 | Iverson | |
| 2,779,067 A | 1/1957 | Stanley | |
| 3,026,401 A | 3/1962 | Cheviron | |
| 3,152,367 A | 10/1964 | Fairbanks | |
| 3,282,623 A * | 11/1966 | Paro | B60J 3/0208 296/97.8 |
| 3,848,919 A * | 11/1974 | Smith | B60J 3/04 296/97.2 |
| 4,105,246 A | 8/1978 | Trumbull | |
| 4,109,562 A * | 8/1978 | MacDonald | B60H 1/247 454/124 |
| 4,549,471 A | 10/1985 | Kochy et al. | |
| 5,641,191 A * | 6/1997 | Jia | B60J 3/02 16/224 |
| 5,957,770 A * | 9/1999 | Boyer | B60S 1/54 454/127 |
| 6,089,971 A | 7/2000 | Jokela et al. | |
| 7,322,632 B1 * | 1/2008 | Marszalek | B60J 3/02 296/97.7 |
| 8,104,727 B2 * | 1/2012 | Joanisse | A47B 23/042 248/276.1 |
| 2006/0172677 A1 | 8/2006 | Ryu | |

FOREIGN PATENT DOCUMENTS

| | | |
|---|---|---|
| CN | 202264746 U | 6/2012 |
| FR | 1196223 A | 11/1959 |
| KR | 20050116728 A | 12/2005 |

* cited by examiner

*Primary Examiner* — Steven S Anderson, II
(74) *Attorney, Agent, or Firm* — Mary M. Lee

(57) ABSTRACT

An apparatus for directing air flow from a defrost vent in a vehicle toward the base of the windshield to de-ice the windshield wiper. A deflector plate is pivotally attached to one end of a jointed arm. The other end of the jointed arm is releasably attachable to the inside of the windshield above the defroster vent. The angles of the jointed arm and the deflector plate are adjusted to direct warm air from the defrost vent directly toward the windshield wiper. A commercial version of the apparatus has a length-adjustable arm to accommodate larger windshields in commercial vehicles.

15 Claims, 12 Drawing Sheets

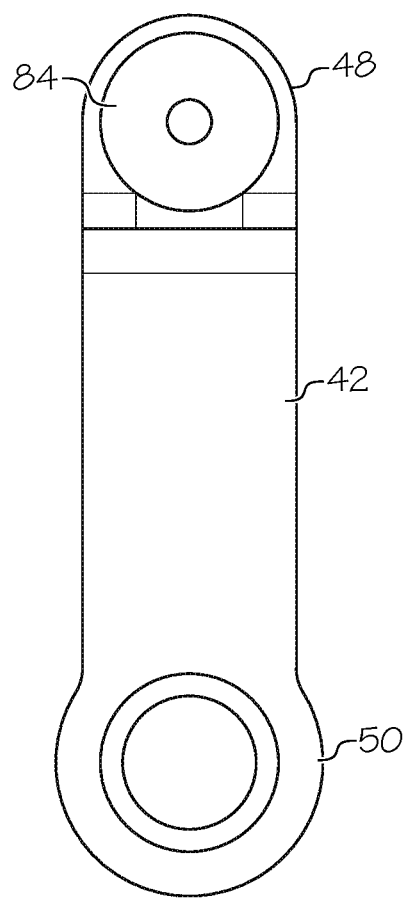
FIG. 12
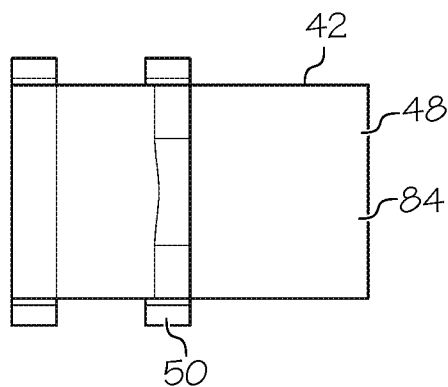 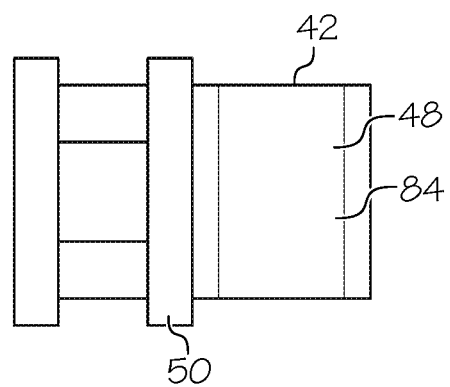
FIG. 13          FIG. 14

DE-ICING WINDSHIELD WIPERS

FIELD OF THE INVENTION

The present invention relates to methods and devices for de-icing windshield wipers on the windshields of vehicles.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 12 is a right side elevational view of the second link.

FIG. 13 is a plan view of the second link.

FIG. 14 is a bottom view of the second link.

DETAILED DESCRIPTION OF THE PREFERRED EMBODIMENT(S)

Modern motor vehicles are equipped with defroster systems that are effective at defogging and defrosting windshields. The primary defroster uses the vehicle's HVAC (heating ventilation and air conditioning) system to clear the front windshield using heated air. In order to melt ice that has accumulated on the windshield, the primary defroster causes the HVAC system to draw in fresh air, pass it through the vehicle's heater core, and then direct the warm air through dashboard vents up toward the inside surface of the front windshield. While these systems are effective at clearing the windshield, ice sometimes remains on the windshield wipers. In accordance with the present invention, a de-icer apparatus is provided to deflect some of the warm air from the vents directly at the wipers to ensure that the wipers are cleared of ice and function properly.

The de-icer apparatus of the present invention attaches removably to the inside of the windshield. This allows the position of the apparatus to be selected based on the particular conditions of the vehicle. A deflector plate is adjustably supported on a jointed arm so that the plate can be positioned over to the dashboard vent to direct air flow at the wipers. In addition to the joint in the arm, the arm is pivotally attached to the plate. These two points of articulation allow the device to accommodate different shapes and sizes of windshields. In particular, the inventive apparatus can be adjusted to fit close to the vent and the base of the windshield regardless of the slope of the windshield relative to the dashboard. Still further, in one embodiment, the length of the support arm is adjustable to accommodate the larger windshields in commercial vehicles. These and other features and advantages of the present invention will become apparent from the following description with reference to the accompanying drawings.

Figure 1:
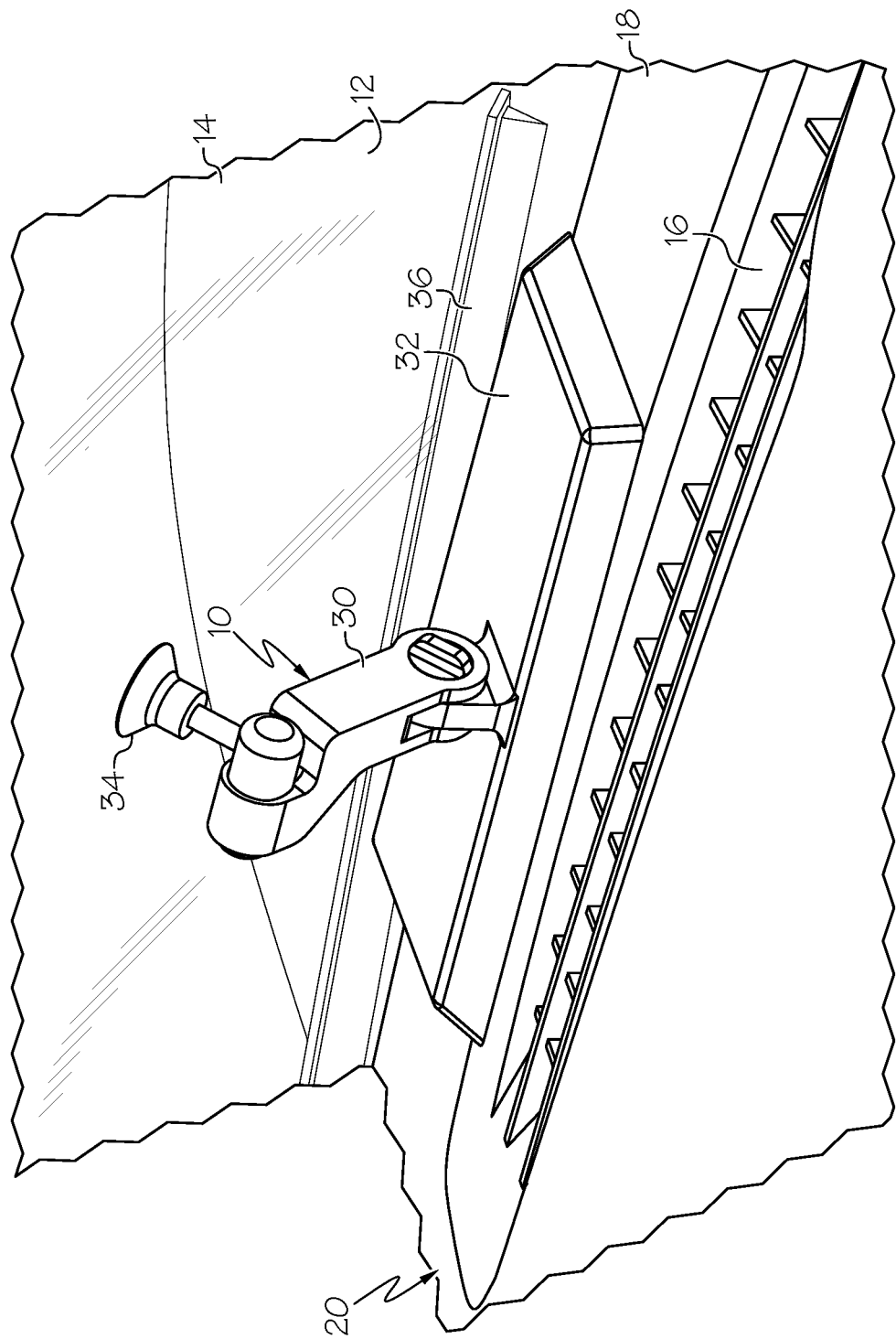
FIG. 1 is a perspective view of a de-icer apparatus made in accordance with a first embodiment of the present invention. The apparatus is shown attached in the inner surface of the windshield of a vehicle over the defrost vent in the top of the dashboard.
Figure 2:
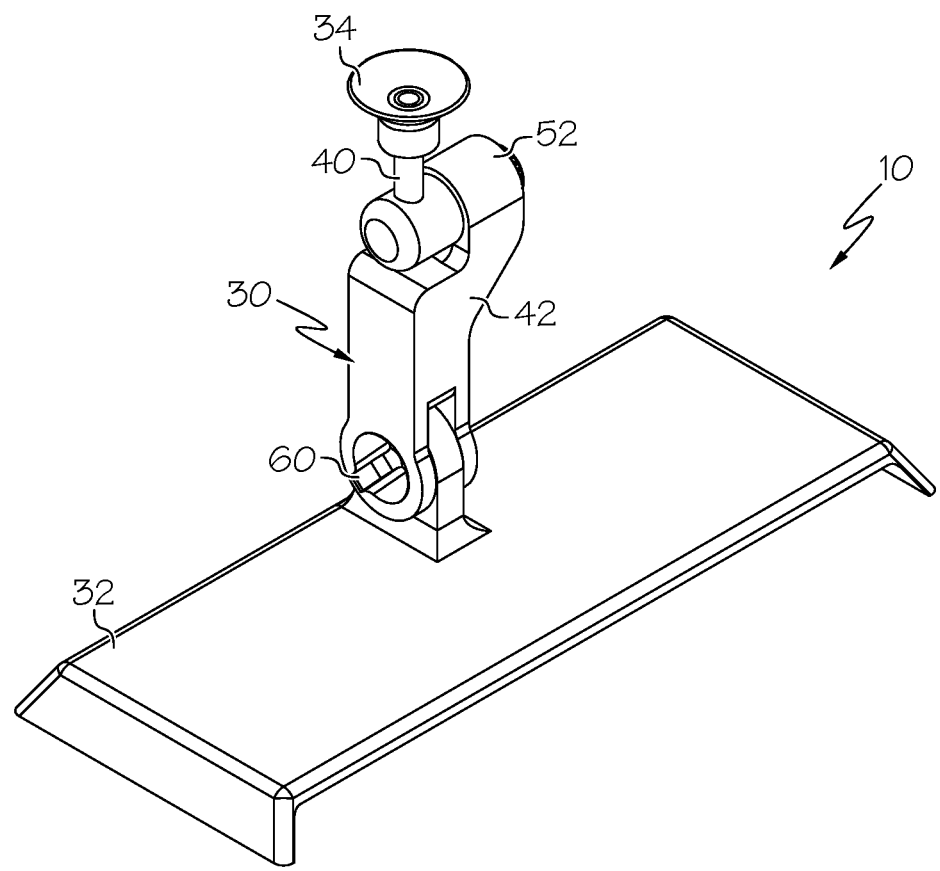
FIG. 2 is a front perspective view of the de-icer apparatus of FIG. 1.
Figure 3:
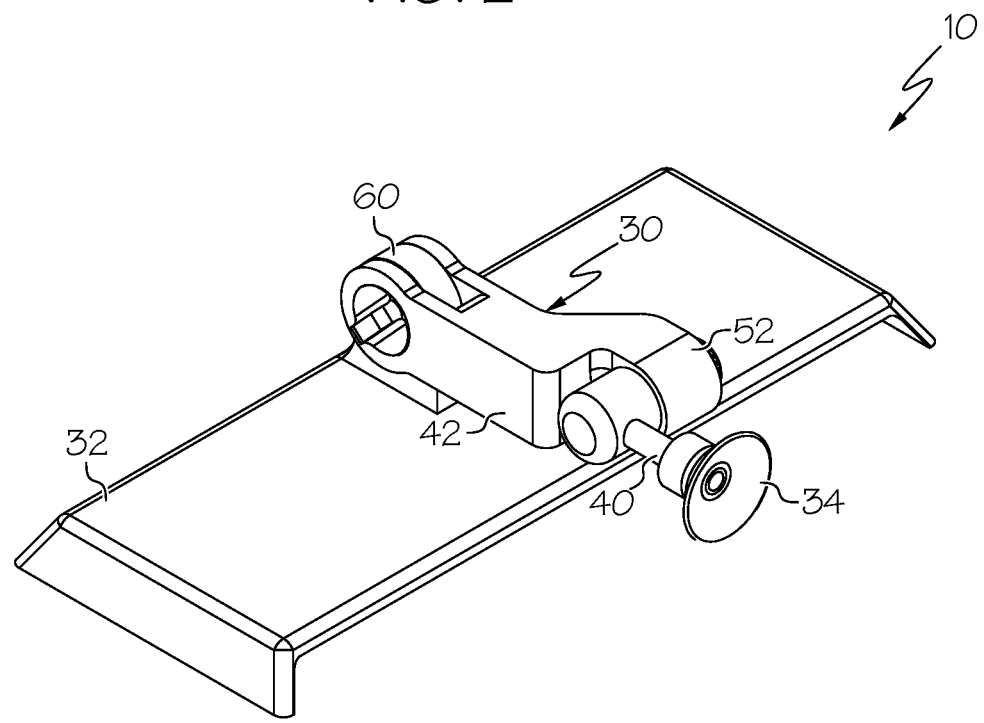
FIG. 3 is a front perspective view of the de-icer apparatus with the jointed arm folded down over the deflector plate in a storage position.
Figure 4:
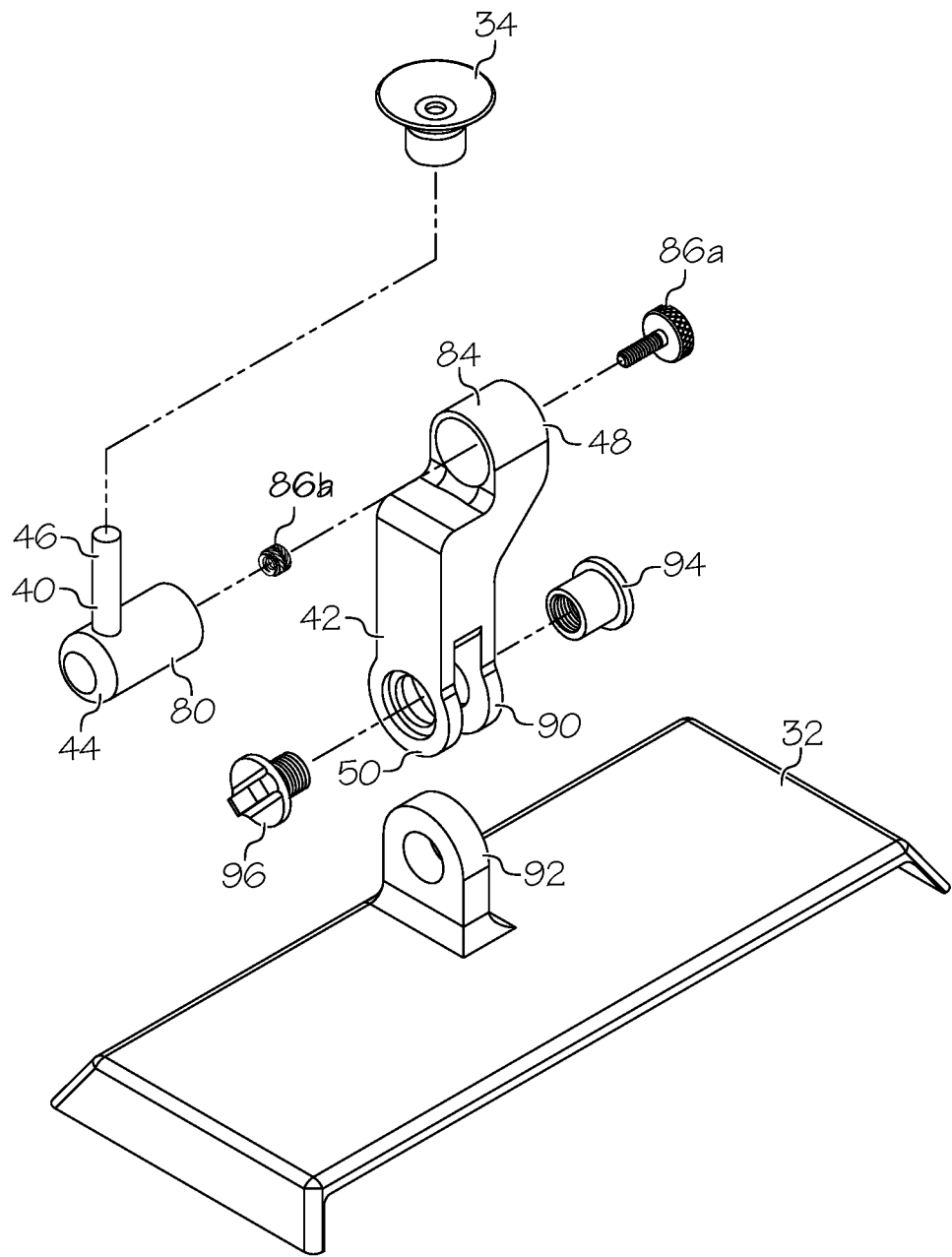
FIG. 4 is an exploded perspective view of the de-icer apparatus of FIG. 1.

Turning now to the drawings in general and to FIG. 1 in particular, there is shown therein a windshield wiper de-icing apparatus made in accordance with a first embodiment of the present invention and designated generally by the reference number 10. The apparatus 10 is shown attached to the inside surface 12 of a windshield 14 above the defroster vent 16 in the dashboard 18 of a vehicle 20. The apparatus 10 comprises a jointed arm 30 supporting a deflector plate 32 on one end. A suction cup 34 or other windshield fastener on the other end of the arm 30 is attached to the windshield. In this position, the deflector plate 32 deflects some of the heated air exiting the vent 16 in the direction of the windshield wiper 36, which is shown in the resting position lying along the outside of the base of the windshield 14.

Referring now to FIGS. 2-6, the apparatus 10 will be explained in more detail. The jointed arm 30 comprises first and second links 40 and 42. The first link 40, shown separately in FIGS. 7-11, has first and second ends 44 and 46. The second link 42, shown separately in FIGS. 12-16, has first and second ends 48 and 50. The first end 44 of the first link 40 is movably connected to the first end 48 of the second link 42.

Figure 5:
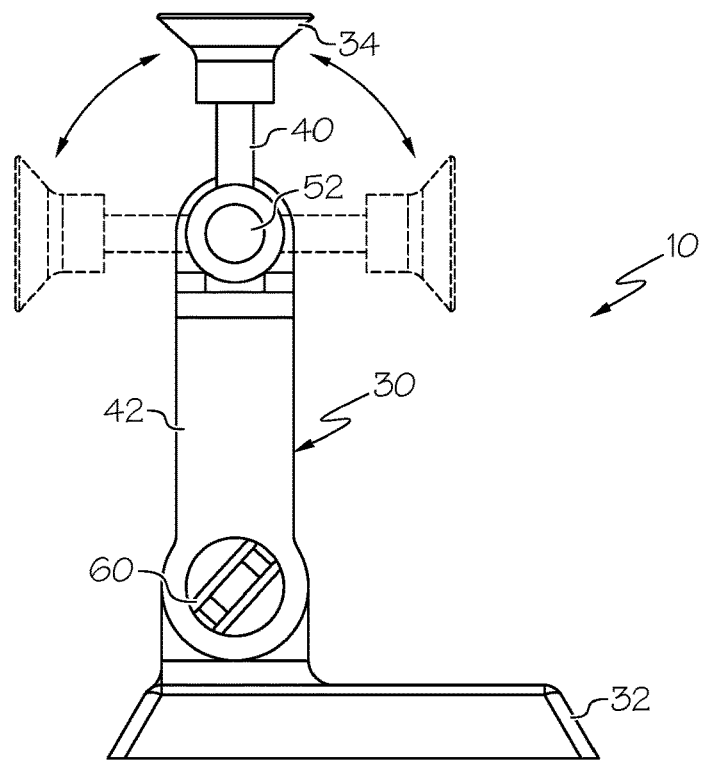
FIG. 5 is a side elevational view of the de-icer apparatus of FIG. 1 showing the range of rotation of the first link of the jointed arm.
Figure 6:
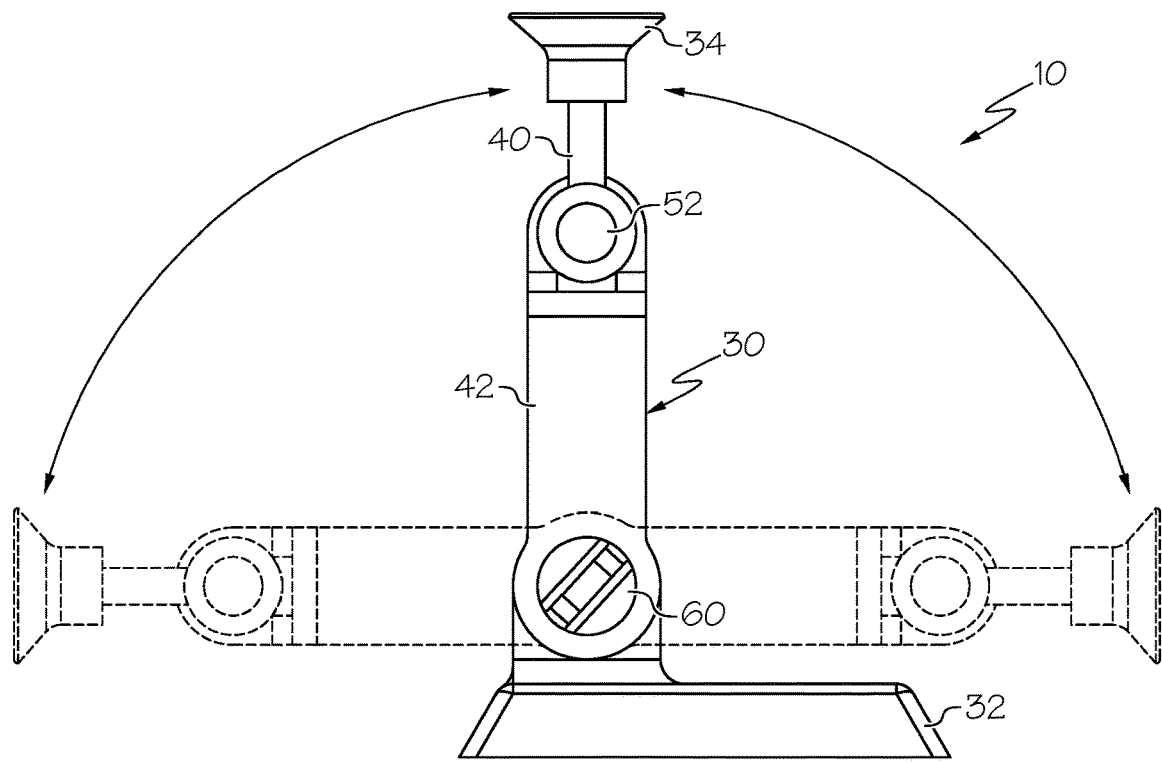
FIG. 6 is a side elevational view of the de-icer apparatus of FIG. 1 showing the range of rotation of the second link of the jointed arm relative to the deflector plate.
Figure 7:
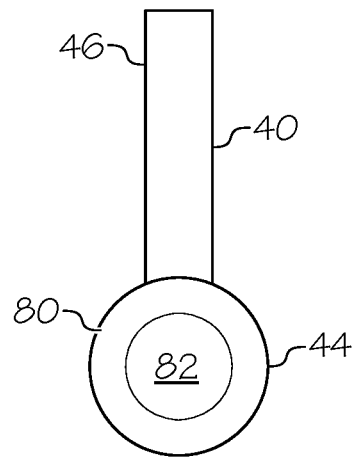
FIG. 7 is a left side elevational view of the first link of the jointed arm.
Figure 8:
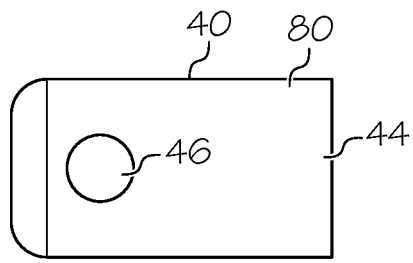
FIG. 8 is a plan view of the first link.
Figure 9:
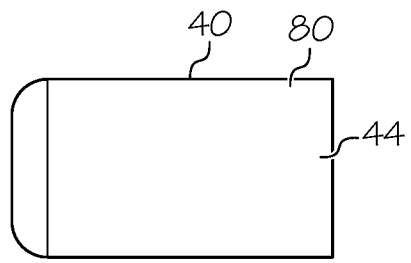
FIG. 9 is a bottom view of the first link.
Figure 10:
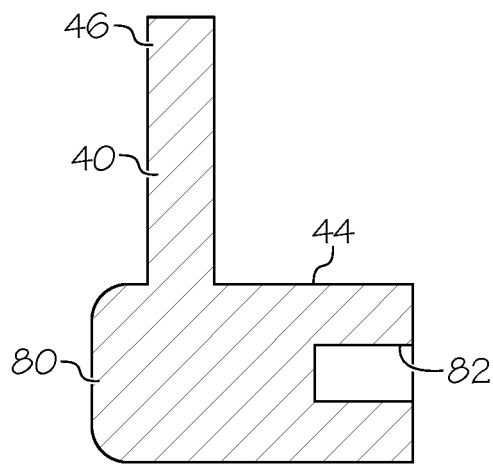
FIG. 10 is a longitudinal sectional view of the first link.
Figure 11:
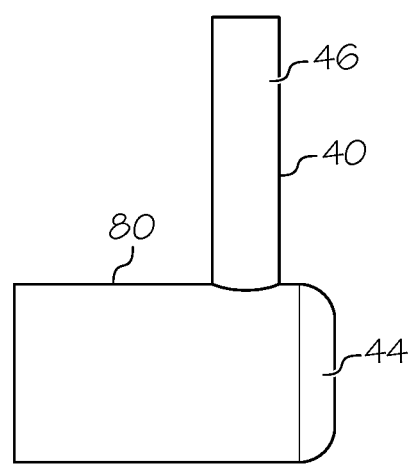
FIG. 11 is a rear elevational view of the first link.
Figure 15:
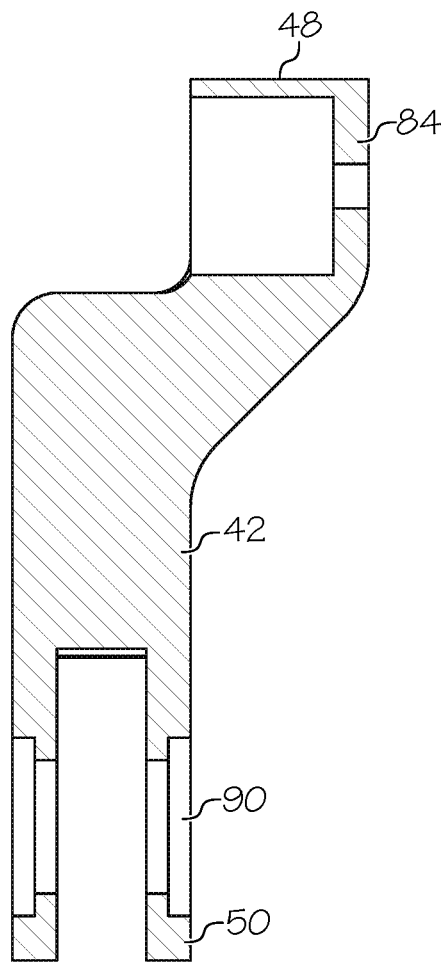
FIG. 15 is a longitudinal sectional view of the second link.
Figure 16:
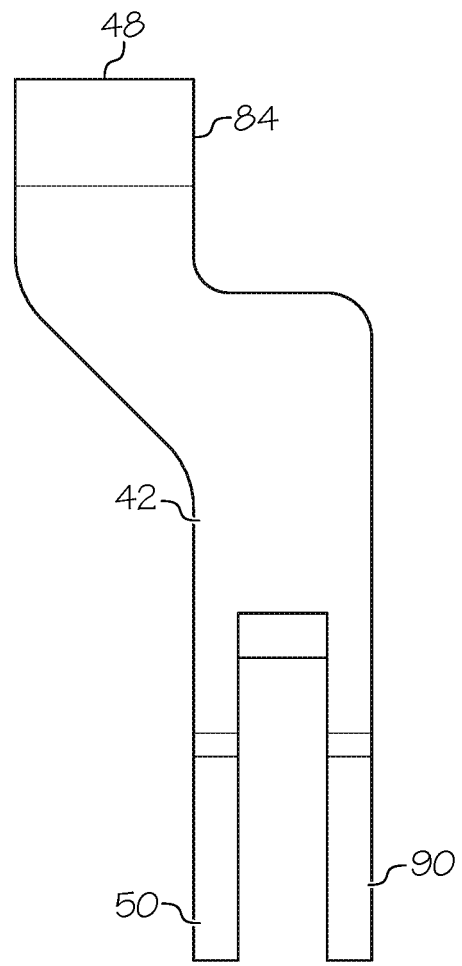
FIG. 16 is a rear elevational view of the second link.
Figure 17:
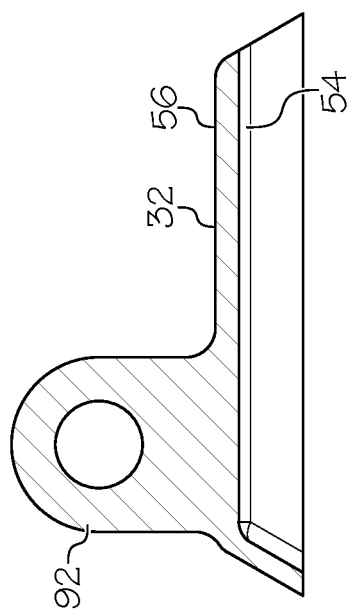
FIG. 17 is a cross-sectional view of the deflector plate.
Figure 18:
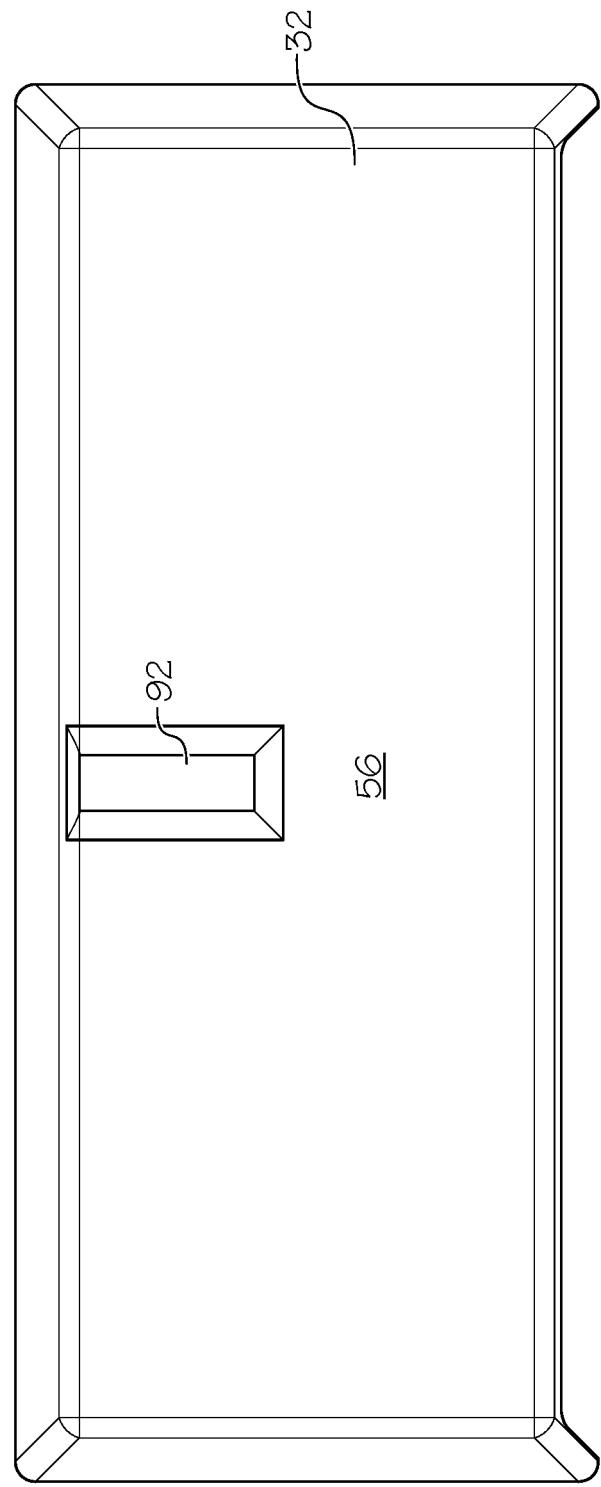
FIG. 18 is a plan view of the deflector plate.
Figure 19:
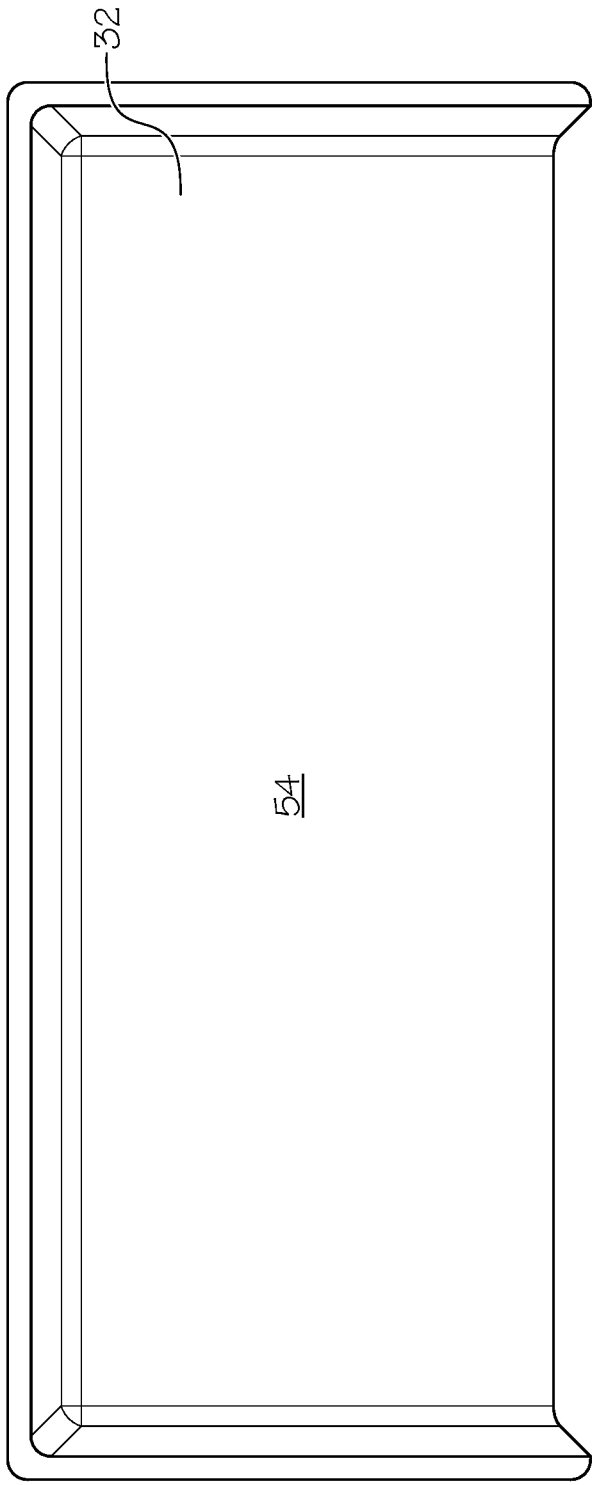
FIG. 19 is a bottom view of the deflector plate.
Figure 20:
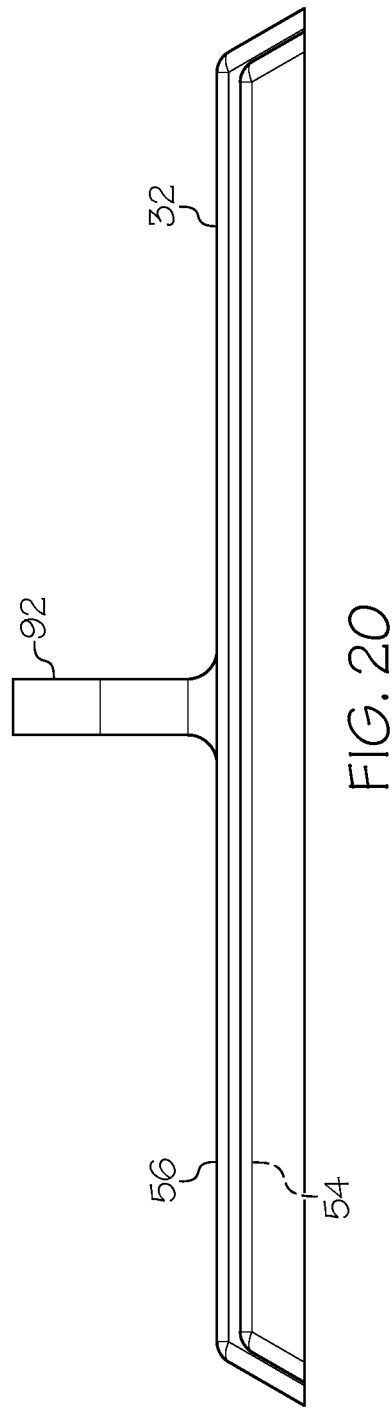
FIG. 20 is a front elevational view of the deflector plate.
Figure 21:
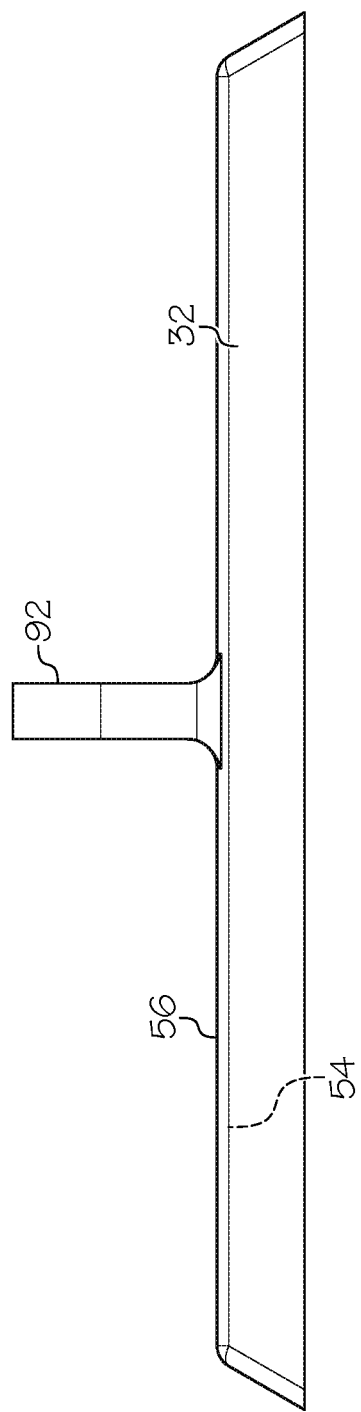
FIG. 21 is a rear elevational view of the deflector plate.

Preferably, the first end 44 of the first link 40 is pivotally connected to the first end 48 of the second link 42. This pivotal connection may be a pivot joint, such as the pin and sleeve joint 52. This allows the first link 40 to rotate relative to the second link 42, as illustrated in FIG. 5. However, the nature of the joint may vary. Additionally, while the joint shown is a pivot joint that allows for rotation in a single plane, joints permitting multi-plane rotation may be employed. For example, a ball and socket joint may be utilized.

The second end 50 of the second link 42 of the arm 30 is movably connected to the plate 32. The plate 32, shown separately in FIGS. 17-21, may be generally rectangular and planar having a front or bottom surface 54 and a rear or back surface 56. Of course, the shape and size of the plate 32 may vary. In the embodiment shown, the second end 50 of the second link 42 of the arm 30 is pivotally connected to the rear surface 56 of the plate 32. This pivotal connection may be a knuckle joint 60. However, the nature of the joint may vary. Additionally, while the joint shown is a pivot joint that allows for rotation in a single plane, joints permitting multi-plane rotation may be employed. For example, a ball and socket joint may be utilized.

Figure 22:
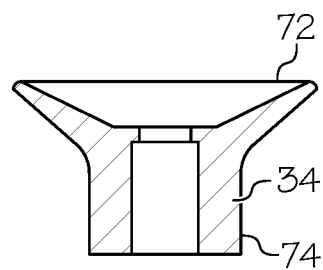
FIG. 22 is a longitudinal sectional view of the windshield fastener cup.
Figure 23:
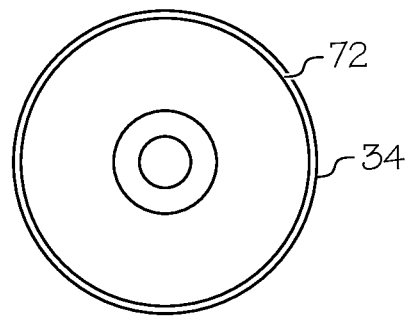
FIG. 23 is an elevational view of the first end of the windshield fastener cup.
Figure 24:
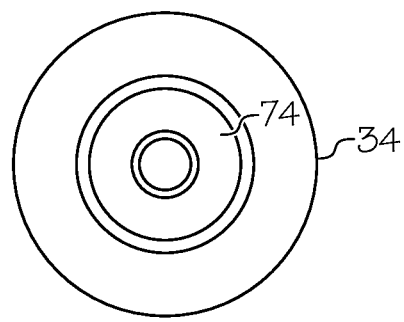
FIG. 24 is an elevational view of the second end of the windshield fastener cup.

As seen in FIGS. 22-24, the windshield fastener 34 comprises first and second ends 72 and 74. The first end 72 is configured for attachment to the inner surface of the windshield 14 of the vehicle 20. As indicated, in the exemplary embodiment, the first end 72 may be provided with a suction cup 34. However, other types of fasteners may be used. For example, an adhesive may be used, such as a releasable adhesive. Alternately, "stick on" hook-and-loop fasteners may be used. These and other types of fasteners fall within the scope of the present invention. The second end 74 of the windshield fastener 34 is attached to the second end 46 of the first link 40 of the jointed arm 30.

Returning to FIGS. 7-16, the pin and sleeve joint 52 forms a pivotal connection between the first end 44 of the first link 40 and the first end 48 of the second link 42. To that end, the first end 44 of the first link 40 may include pin member 80 with a longitudinal bore 82. The first end 48 of the second link 42 may comprise a sleeve member 84 sized to receive the pin member 80, as illustrated in the exploded view of FIG. 4. The pin member 80 is secured inside the sleeve member 84 using a tension screw and bushing, 86a and 86b, seen only in FIG. 4, which will allow rotational movement but prevent axial movement. The bushing 86b fits inside the bore 82 (FIG. 10) and receives the threaded shaft of the screw 86a. The screw 86a may have a knurled head for easy adjustment. The angle of the jointed arm 30 may be adjusted by reversing the screw 86a slightly, adjusting the angle, and then retightening the screw.

Referring again to FIG. 12-21, the knuckle joint 60 forms a pivotal connection between the second end 50 of the second link 42 of the arm 30 and the rear surface 56 of the plate 32. In the exemplary embodiment, the second end 50 of the second link 42 forms a fork end 90 and an eye 92 is provided on the rear surface 56 of the plate 32. The eye 92 and fork end 90 are secured in pivotal relation by a knuckle pin 94 and collar bolt 96, seen only in FIG. 4. More specifically, the knuckle pin 94 has an internally threaded bore that receives the externally threaded shaft of the collar bolt 96. This allows rotational movement but prevents axial movement. The pin and bolt 94 and 96 operate like a tension screw to allow adjustment of the position of the plate 32 relative to the arm 30.

Figure 25:
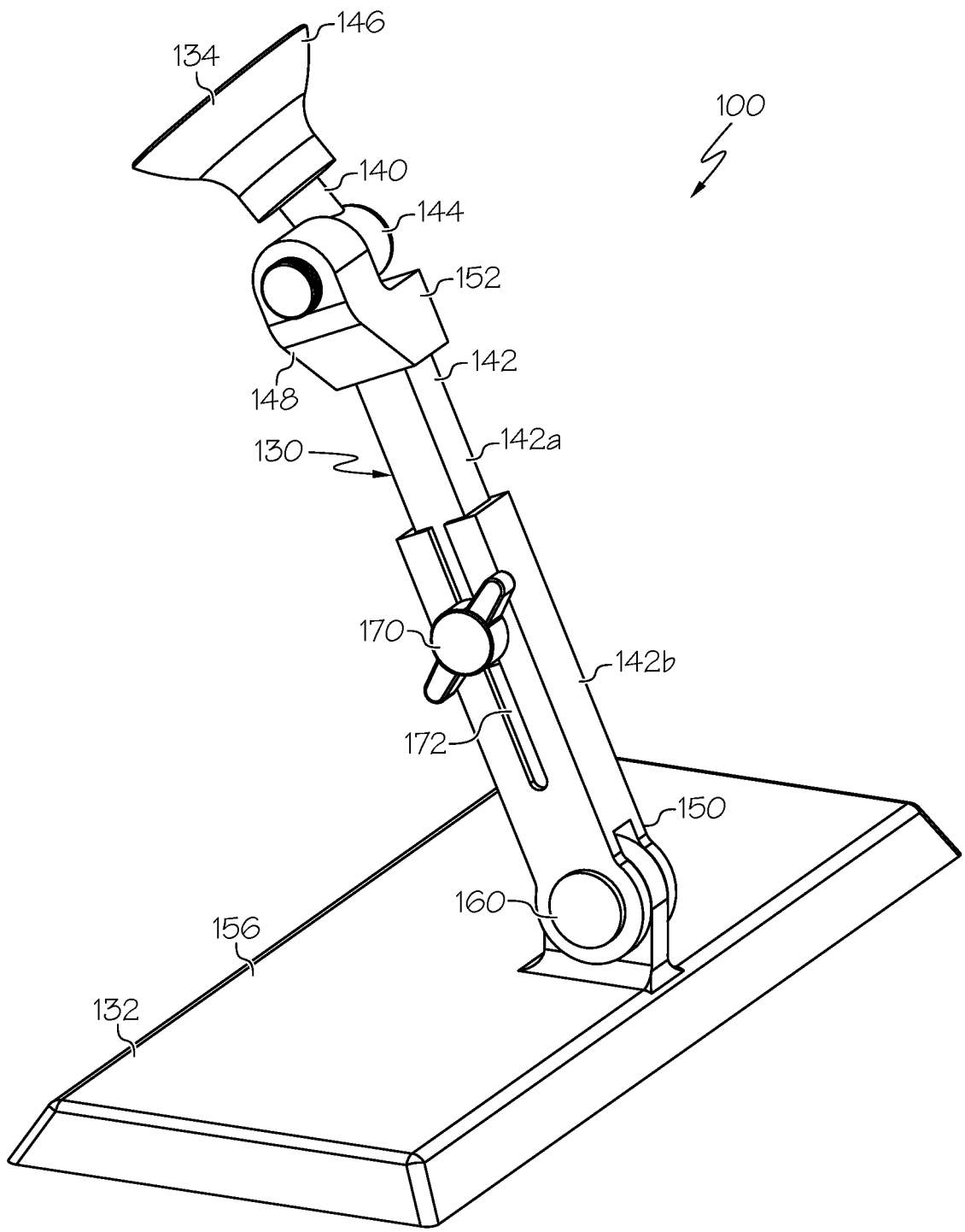
FIG. 25 is a frontal perspective view of a second embodiment of the de-icer apparatus of the present invention. The second link is adjustable in length to accommodate larger commercial vehicles.

A second embodiment adapted for larger, commercial vehicles is shown in FIG. 25, to which attention is now directed. The apparatus, designated generally by the reference number 100, comprises 6a jointed arm 130 supporting a deflector plate 132 on one end. A suction cup 134 or other windshield fastener on the other end of the arm 130 is attachable to the windshield 14 (FIG. 1). The jointed arm 130 comprises first and second links 140 and 142. The first link 140 has first and second ends 144 and 146, and the second link 142 has first and second ends 148 and 150. The first end 144 of the first link 140 is movably connected to the first end 148 of the second link 142 by a pivot joint 152. The second end 150 of the second link 142 of the arm 130 is pivotally connected to the rear surface 156 of the plate 132 by a knuckle joint 160. The joints 152 and 160 are similar to the joints 52 and 60 of the previous embodiment.

In this embodiment, the length of the second link 142 is adjustable. Although the structure may vary, in the illustrative embodiment of FIG. 25, the second link 142 comprises inner and outer telescopically engaged members 142a and 142b. A wing screw 170, that is, a set screw with a wing grip, is receivable in a longitudinal slot 172 in the outer telescoping member 142b, may be used to releasably tighten the first and second telescopically engaged members at a selected position.

In accordance with the method of the present invention, illustrated in FIG. 1, the above-described de-icing apparatus 10 may be used for directing air flow from a defrost vent 16 in a vehicle 20 having a windshield 14 with an inner surface and a windshield wiper 36. The wiper 36 is movable between a resting position, shown in FIG. 1, and a wiping motion. When the wiper is coated with ice, the user attaches the suction cup 34 to the windshield 14 an operative distance above the defrost vent 16 and the windshield wiper 36. As used herein, "operative distance" refers to a distance that will direct warm air from the vent 16 to de-ice the wiper.

Before or after attaching the suction cup 34 to the windshield 14, the user adjusts the angle between the first and second links 40 and 42 using the tension screw 86a. The user also adjusts the angle of the plate 32 relative to the second link 42 using the knuckle pin 94 and collar 96. As illustrated in FIG. 1, the deflector plate 32 is positioned horizontally over the defrost vent 16, that is, generally parallel to the dashboard 18, to direct air flow from the defrost vent toward the windshield wiper 36 when the windshield wiper is in the resting position to de-ice the windshield wiper. When using the commercial embodiment 100 (FIG. 25), the user may also adjust the length of the second link 142. Then, with apparatus 10 (or 100) secured to the windshield 14, the vehicle's defroster system is operated until sufficient ice melting is achieved. Once de-icing is complete, the apparatus 10 (or 100) may be removed from the windshield 14 and folded into a storage position, as shown in FIG. 3, until needed once again.

The embodiments shown and described above are exemplary. Many details are often found in the art and, therefore, many such details are neither shown nor described herein. It is not claimed that all of the details, parts, elements, or steps described and shown herein are newly invented. Changes may be made in the details, especially in matters of shape, size, and arrangement of the parts, within the principles of the invention to the full extent indicated by the broad meaning of the terms in the attached claims. Unless otherwise stated explicitly, each and every element of the above described invention is optional. The description and drawings of the specific embodiments herein do not point out what an infringement of this patent would be, but rather provide non-limiting examples of how to use and make the invention. Likewise, the abstract is neither intended to define the invention, which is measured by the claims, nor is it intended to be limiting as to the scope of the invention in any way. The limits of the invention and the bounds of the patent protection are measured by and defined in the following claims.

What is claimed is:

1. A method for directing air flow in a vehicle, wherein the vehicle has a dashboard with a forward edge, a windshield having an inner surface and an outer surface and extending upward from the forward edge of the dashboard, a windshield wiper at the base of the outer surface of the windshield adjacent the forward edge of the dashboard, and a defrost vent in the dashboard near the forward edge of the dashboard and near the bottom edge of the inside surface of the windshield, wherein the windshield wiper is movable between a resting position and wiping positions, the method comprising:
- providing an apparatus for directing some of the air flow from the defrost vent at the windshield wiper, wherein the apparatus comprises:
  - a jointed arm comprising first and second links, wherein each of the first and second links has a first end and a second end, and wherein the first end of the first link is movably connected to the first end of the second link;
  - a deflector plate movably connected to the second end of the second link;
  - a windshield fastener having first and second ends, wherein the first end is configured for attachment to the inner surface of the windshield of the vehicle and wherein the second end of the windshield fastener is attached to the second end of the first link of the jointed arm;
- attaching the windshield fastener to the inner surface of windshield of the vehicle an operative distance above the defrost vent;
- positioning the deflector plate horizontally over the defrost vent by adjusting the angle between the first and second links and the angle between the plate and the second link to direct air flow from the defrost vent toward the windshield wiper when the windshield wiper is in the resting position to de-ice the windshield wiper; and
- operating the vehicle's defroster system.

2. The method of claim 1 wherein the windshield fastener comprises a suction cup.

3. The method of claim 1 wherein the deflector plate has a front and rear surface and wherein the front surface is planar and wherein the second end of the second link of the jointed arm is attached to the rear surface of the deflector plate.

4. The method of claim 3 wherein the second end of the second link of the arm is pivotally connected to the deflector plate.

5. The method of claim 4 wherein the pivotal connection between the second end of the second link of the arm and the rear surface of the deflector plate is a knuckle joint.

6. The method of claim 1 wherein the second end of the second link of the arm is pivotally connected to the deflector plate.

7. The method of claim 6 wherein the pivotal connection between the second end of the second link of the arm and the rear surface of the deflector plate is a knuckle joint.

8. The method of claim 1 wherein the first end of the first link is pivotally connected to the first end of the second link.

9. The method of claim 8 wherein the pivotal connection comprises a pin and sleeve joint.

10. The method of claim 1 wherein the second link is length adjustable.

11. The method of claim 10 wherein the second link comprises first and second telescopically engaged members.

12. The method of claim 11 further comprising a set screw for tightening the first and second telescopically engaged members at a selected position.

13. The method of claim 10 further comprising the step of:
  - adjusting the length of the second link to direct air flow from the defrost vent toward the windshield wiper.

14. The method of claim 1 wherein the jointed arm is a single jointed arm for supporting the deflector plate.

15. The method of claim 1 wherein the jointed arm is a single jointed arm for supporting the deflector plate, wherein the deflector plate has a front and rear surface, and wherein the second end of the second link is attached to the rear surface of the deflector plate.

* * * * *